United States Patent
Bryant et al.

(10) Patent No.: US 10,046,685 B1
(45) Date of Patent: Aug. 14, 2018

(54) SCREEN ASSEMBLY FOR PROVIDING A VISUAL BARRIER BETWEEN ADJACENT SEATS IN A PASSENGER CABIN OF A VEHICLE

(71) Applicant: GM Global Technology Operations LLC, Detroit, MI (US)

(72) Inventors: Wade W. Bryant, Grosse Pointe Farms, MI (US); John McDougall, Detroit, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/635,827

(22) Filed: Jun. 28, 2017

(51) Int. Cl.
| | |
|---|---|
| B60N 2/90 | (2018.01) |
| B60R 21/06 | (2006.01) |
| B60N 2/44 | (2006.01) |
| E06B 9/42 | (2006.01) |
| E06B 9/70 | (2006.01) |

(52) U.S. Cl.
CPC ............... B60N 2/91 (2018.02); B60N 2/441 (2013.01); E06B 9/42 (2013.01); E06B 9/70 (2013.01); B60R 21/06 (2013.01)

(58) Field of Classification Search
CPC .......... B60N 2/91; B60N 2/441; B60R 21/06; B60R 21/026; B60R 21/12; E06B 9/42; E06B 9/70
USPC .............. 296/24.4, 24.42, 24.43, 24.46, 97.7
See application file for complete search history.

(56) References Cited

U.S. PATENT DOCUMENTS

| | | | | |
|---|---|---|---|---|
| 4,971,378 A | * | 11/1990 | Setina | B60R 21/12 16/304 |
| 6,502,859 B1 | * | 1/2003 | Svetlik | B60R 21/06 280/748 |
| 7,537,257 B2 | * | 5/2009 | Watanabe | B60R 7/04 296/24.46 |
| 2001/0033084 A1 | * | 10/2001 | Murray | B60J 1/2011 296/24.46 |
| 2009/0033124 A1 | * | 2/2009 | Benzing | B60N 2/91 296/180.5 |
| 2012/0217765 A1 | * | 8/2012 | Michael | B60N 2/91 296/24.46 |
| 2014/0130990 A1 | * | 5/2014 | Wong | B60J 1/2013 160/309 |
| 2016/0046215 A1 | * | 2/2016 | Lebowitz | B60N 2/91 296/24.46 |

* cited by examiner

*Primary Examiner* — Gregory A Blankenship

(57) ABSTRACT

A screen assembly includes an anchor arm, a cover arm, a spool arm, a spool, and a flexible screen. The anchor arm is connected to a component of the vehicle within the passenger cabin. The spool arm is disposed between the anchor arm and the cover arm. The spool is inserted onto the spool arm and can rotate relative to the spool arm. The flexible screen is attached to the spool and includes first and second portions. The first portion has a first edge attached to the spool arm and a second edge attached to the anchor arm. The second portion includes a first edge attached to the spool arm and a second edge attached to the cover arm. The first and second portions are dispensed in opposite directions when at least one of the cover arm and the anchor arm moves relative to the spool arm.

20 Claims, 8 Drawing Sheets

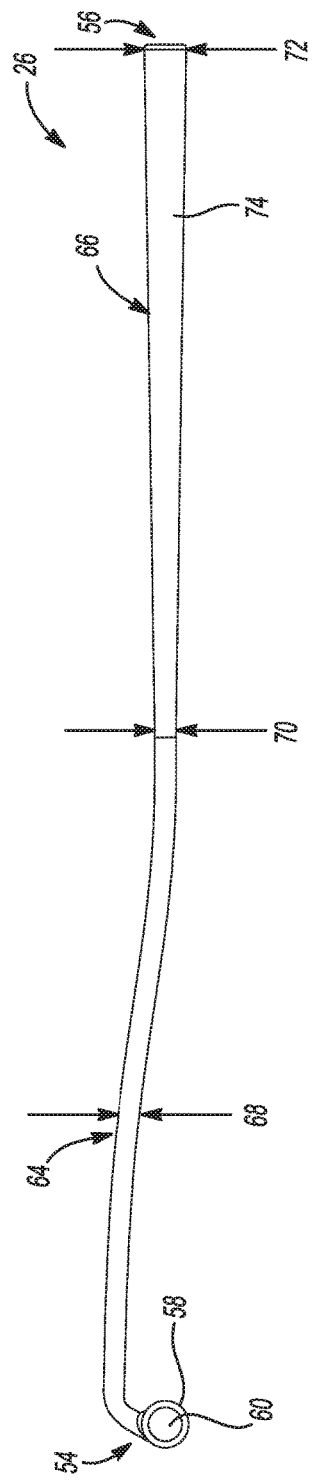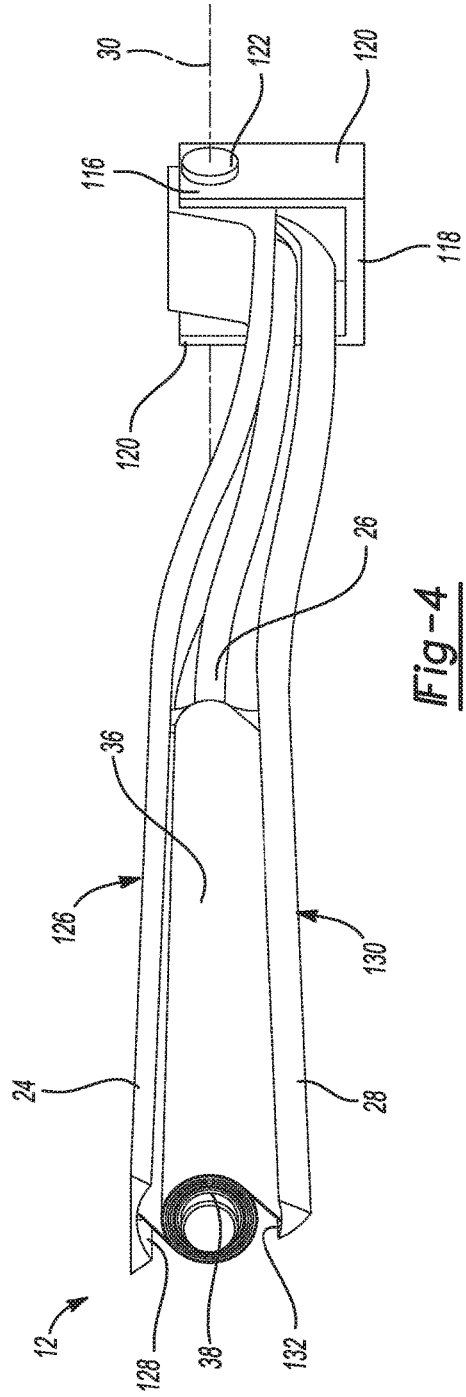

SCREEN ASSEMBLY FOR PROVIDING A VISUAL BARRIER BETWEEN ADJACENT SEATS IN A PASSENGER CABIN OF A VEHICLE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to screen assemblies for providing a visual barrier between adjacent seats in a passenger cabin of a vehicle.

Some vehicles are equipped with one or more screen assemblies, which are used as privacy barriers or sun shades. A screen assembly typically includes a flexible screen having opposing ends that are fixed to a pair of arms. The screen is opened by moving one of the arms through a straight path away from the other arm. Thus, the screen extends between the arms when the screen assembly is opened.

SUMMARY

The present disclosure provides a screen assembly for providing a visual barrier between adjacent seats in a passenger cabin of a vehicle. The screen assembly includes an anchor arm, a cover arm, a spool arm, a spool, and a flexible screen. The anchor arm is connected to a component of the vehicle within the passenger cabin. The spool arm is disposed between the anchor arm and the cover arm. The spool is inserted onto the spool arm. The spool arm can rotate relative to the spool arm. The flexible screen is attached to the spool. The flexible screen includes first and second portions. The first portion has a first edge attached to the spool arm and a second edge attached to the anchor arm. The second portion includes a first edge attached to the spool arm and a second edge attached to the cover arm. The first and second portions of the flexible screen are dispensed in opposite directions when at least one of the cover arm and the anchor arm moves relative to the spool arm.

In some configurations, the cover arm is pivotally connected to the component. The cover arm can rotate relative to the component about a pivot axis.

In some configurations, each of the anchor arm, the cover arm, and the spool arm is pivotally connected to the component. Each of the anchor arm, the cover arm, and the spool arm can rotate relative to the component about the pivot axis.

In some configurations, the screen assembly further includes a bracket that is fixed to the component. The bracket pivotally connects each of the anchor arm, the cover arm, and the spool arm to the component. The anchor arm, the cover arm, and the spool arm are co-axially mounted to the bracket.

In some configurations, the bracket includes a stop that can engage the anchor arm to prevent rotation of the anchor arm in a first direction beyond a first position.

In some configurations, the screen assembly is adjustable between a stored position and a deployed position. When the screen assembly is in the stored position, the cover arm is disposed at a first angle with respect to the component. When the screen assembly is in the deployed position, the cover arm is disposed at a second angle with respect to the component, the anchor arm is disposed at a third angle with respect to the component, and the spool arm is disposed at a fourth angle with respect to the component. The second angle is greater than the first angle. The third angle is greater than the first angle and less than the second angle. The fourth angle is greater than the third angle and less than the second angle.

In some configurations, the screen assembly further includes a drive motor. The drive motor is coupled to the cover arm. The drive motor can be operated to pivot the cover arm between the first angle and the second angle.

In some configurations, the screen assembly further includes a drive transfer spring. The drive transfer spring couples the anchor arm to the cover arm. The drive transfer spring applies a biasing force to the anchor arm to pivot the anchor arm to the third angle when the cover arm pivots from the first angle to the second angle.

In some configurations, the spool and the flexible screen apply a tension force on the spool arm to maintain the spool arm at a location that is equidistant between the anchor arm and the cover arm.

The present disclosure provides another screen assembly for providing a visual barrier between adjacent seats in a passenger cabin of a vehicle. The screen assembly includes an anchor arm, a cover arm, and a flexible screen. The anchor arm is connected to a component of the vehicle within the passenger cabin. The cover arm is pivotally connected to the component. The cover arm is rotatable relative to the component between a first position and a second position. The cover arm is disposed at a first angle relative to the component when the cover arm is in the first position. The cover arm is disposed at a second angle relative to the component when the cover arm is in the second position. The second angle is greater than the first angle. The cover arm is spaced apart from the anchor arm to define a gap when the cover arm is disposed at the second angle relative to the component. The flexible screen has a first edge and a second edge. The first edge is fixed to the anchor arm. The second edge is fixed to the cover arm. The flexible screen extends through an arc-shaped path across the gap when the cover arm is disposed at the second angle relative to the component.

In some configurations, the screen assembly further includes a drive motor coupled to the cover arm. The drive motor can pivot the cover arm between the first angle and the second angle.

In some configurations, each of the cover arm and the anchor arm is pivotally connected to the component and can rotate about a pivot axis.

In some configurations, the screen assembly further includes a spool arm, and a spool. The spool arm is disposed between the anchor arm and the cover arm. The spool arm is pivotally connected to the component. The spool arm can be rotated about the pivot axis. The spool is inserted onto the spool arm. The spool can be rotated relative to the spool arm. The flexible screen includes a first portion and a second portion. The first portion has a first edge attached to the spool and a second edge attached to the anchor arm. The second portion has a first edge attached to the spool and a second edge attached to the cover arm. The first and second portions of the flexible screen are dispensed in opposite directions as at least one of the cover arm and the anchor arm pivots relative to the spool arm.

In some configurations, the spool is has a conical frustum shape.

In some configurations, the flexible screen has an inner edge disposed at a first radius relative to the pivot axis and an outer edge disposed at a second radius relative to the pivot axis. The spool has a first diameter at a first end of the spool and a second diameter at a second end of the spool. The first end of the spool is disposed adjacent the pivot axis. The second end of the spool is disposed opposite of the first end. A first ratio of the first diameter to the second diameter is proportional to a second ratio of the first radius to the second radius.

In some configurations, the screen assembly is adjustable between a stored position and a deployed position. When the screen assembly is in the stored position, the cover arm is disposed at the first angle relative to the component. When the screen assembly is in the deployed position, the cover arm is disposed at the second angle with respect to the component and the anchor arm is disposed at a third angle with respect to the component. The third angle is greater than the first angle and less than the second angle.

In some configurations, the screen assembly further includes a drive transfer spring. The drive transfer spring couples the anchor arm to the cover arm. The drive transfer spring can apply a biasing force to the anchor arm to pivot the anchor arm between the first angle and the third angle when the cover arm pivots between the first angle and the third angle.

In some configurations, the screen assembly further includes a bracket that pivotally connects each of the anchor arm and the cover arm to the component. The bracket includes a stop that can engage the anchor arm to prevent rotation of the anchor arm to a fourth angle that is greater than the third angle.

In some configurations, the component is a shelf that is disposed rearward of the seats. The screen assembly is disposed below a top surface of the shelf when the screen assembly is in the stored position.

In some configurations, the screen assembly is adjustable to an anchor position. The anchor position is disposed between the stored position and the deployed position. When the screen assembly is in the anchor position, the anchor arm is disposed at the third angle relative to the component and the cover arm is disposed at a fifth angle relative to the component. The fifth angle is within 5 degrees of the third angle.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 3 is a side view of the spool arm of FIG. 2;

FIG. 4 is a perspective view of the screen assembly of FIG. 1A;

In the drawings, reference numbers may be reused to identify similar and/or identical elements.

DETAILED DESCRIPTION

Figure 1A:
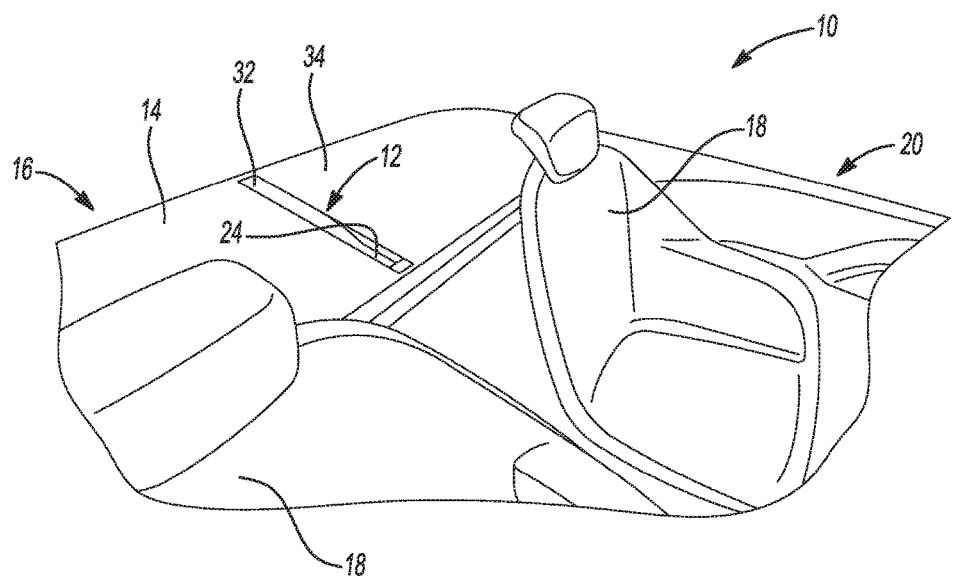
FIG. 1A is a perspective view of a portion of a vehicle including a screen assembly according to the present disclosure, with the screen assembly in a stored position.

As discussed above, some vehicles include screen assemblies that are used as sun shades or privacy barriers. Screen assemblies may be particularly useful in ride-share vehicles. Ride-share vehicles are commonly occupied by two or more unacquainted parties. In situations where the parties want privacy, occupant comfort can be improved shielding one party from eye-to-eye contact with another party.

Privacy screens may be closed and stored when they are not in use. For example, screen assemblies may be mounted to vehicle ceiling and stored adjacent to the ceiling when they are not in use. Screen assemblies can be opened downward so that they extend between the parties to provide a privacy barrier. However, many vehicles lack adequate cabin head space for a ceiling mount and the stored screen assembly may create discomfort, particularly for taller passengers.

Screen assembles may alternatively be stored between seats when they are not in use. However, placement of a screen assembly in seating space may reduce the space available for passengers to sit and cause discomfort for larger passengers. Moreover, placement of the screen assembly between seats reduces the space available for the passengers' belongings, such as bags or umbrellas.

Regardless of whether a screen assembly is stored on the ceiling or between seats, the screen assembly reduces available cabin space. Cabin space is already limited in ride-share situations, particularly in smaller vehicles. In addition to reduced cabin space, screen assemblies may cause passenger discomfort by creating an obstruction in the passenger's elbow space or head space. Thus, the use of screen assemblies in ride-share vehicles is often unwieldy or logistically challenging.

A screen assembly typically includes a flexible screen extending between a pair of parallel arms. One of the arms is fixed to the vehicle, and the other arm is pulled away from the fixed arm in a straight path to open the screen assembly. When only a single arm is fixed to the vehicle, the screen is likely to swing and bend from motion of the vehicle as it travels. The screen may hit passengers as it swings. It may also shift out of its position and eliminate the visual barrier between passengers. Thus, screen assemblies as described above are undesirable for some moving vehicle applications.

The present disclosure relates to a screen assembly for providing a visual barrier between adjacent seats in a passenger cabin of a vehicle. In one example, the screen assembly is stored in a location that is not directly between the adjacent seats, and the screen assembly has a deployed position that is between the adjacent seats and distant from its storage position. Thus, the screen assembly enables a more spacious passenger cabin and is unobtrusive to passengers when it is not in use. Furthermore, storing the screen assembly in a location distant from the passenger area creates a more aesthetically-pleasing passenger cabin.

In various implementations, the screen assembly has a pair of arms that pivot with respect to one another about a common pivot axis. The screen is deployed in an arc shape as one of the arms pivots with respect to the other arm. Thus, the screen is supported by the pivotally-connected arms and remains in place between the passengers as the vehicle moves.

In various implementations, the screen assembly includes a screen having first and second portions. The first and second portions of the screen are attached to a spool. When the screen assembly is in the stored position, the first portion and the second portion are bi-wound around the spool. As the screen is deployed, the first portion and the second portion of the screen are dispensed in opposite directions.

Figure 1B:
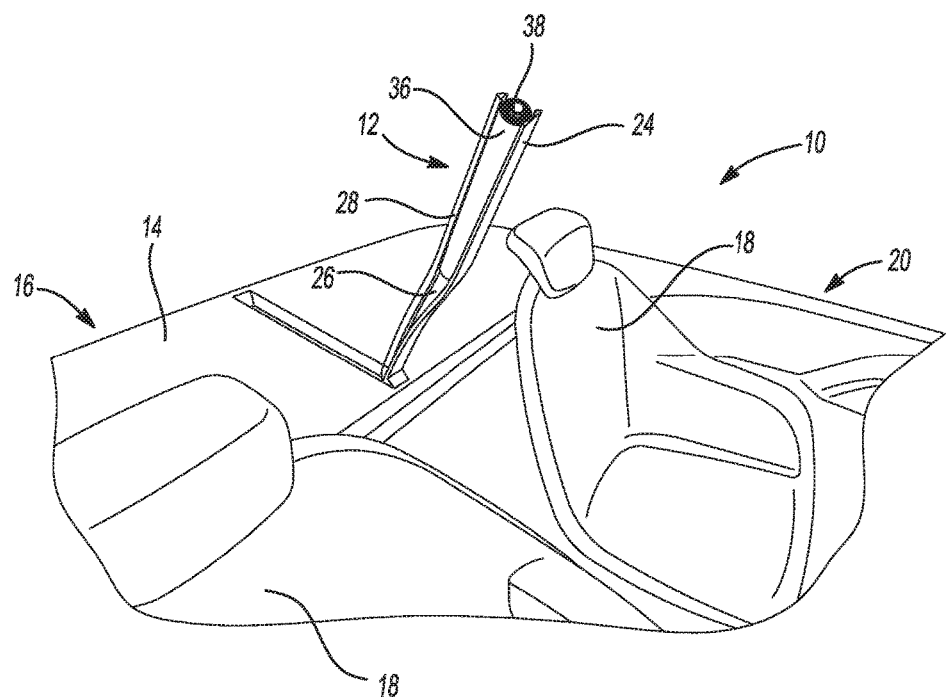
FIG. 1B is a perspective view of the vehicle portion and the screen assembly of FIG. 1A, with the screen assembly in an anchor position.
Figure 1C:
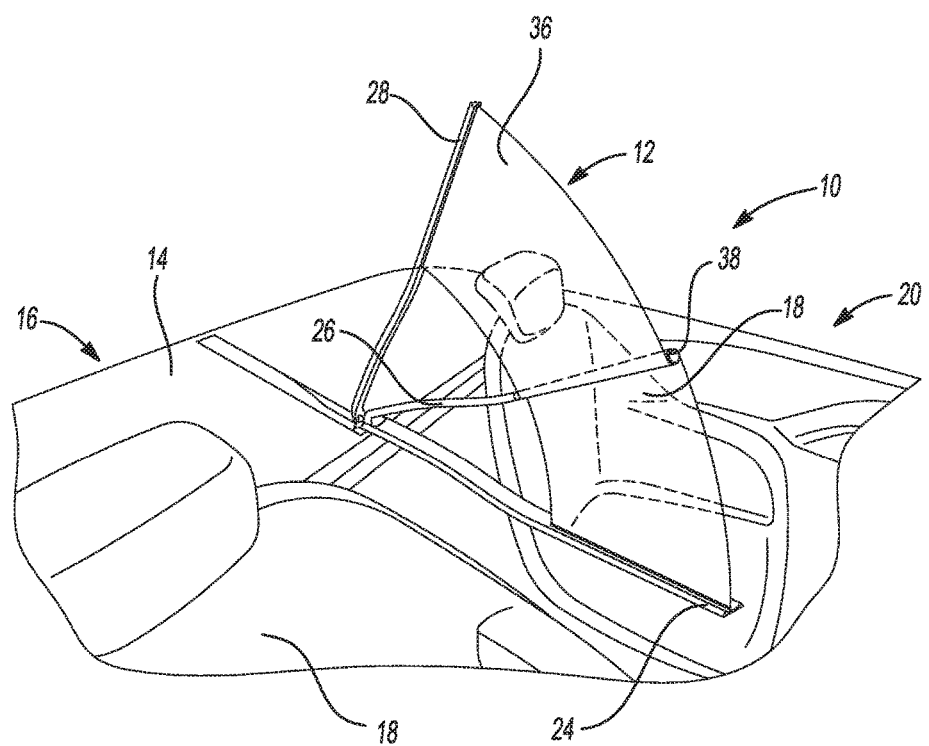
FIG. 1C is a perspective view of the vehicle portion and the screen assembly of FIG. 1A, with the screen assembly in a deployed position.

Referring to FIGS. 1A-1C, a vehicle 10 including screen assembly 12 according to certain aspects of the present disclosure is shown. The screen assembly 12 moves between a stored position, an anchor position, and a deployed position, where it is open. In one example, the screen assembly 12 is stored on or under a parcel shelf 14 near a rear end 16 of the vehicle 10 (FIG. 1A). The parcel shelf 14 is disposed rearward of vehicle seats 18. The screen assembly 12 deploys between adjacent seats 18 in the vehicle 10 to provide a visual barrier for privacy (FIG. 1C).

Although the screen assembly 12 is shown between seats 18 disposed near the rear end 16 of the vehicle 10, alternative locations for the screen assembly 12 are also contemplated. For example, the screen assembly 12 may be disposed between front seats, cross-car between rows of seats (e.g., driver and back seat passenger), or between the seat 18 and a window (not shown). The screen assembly 12 may also be used in other non-automotive vehicle applications, such as between or adjacent to airplane seats or bus seats. Additionally, the screen assembly 12 can be used for non-vehicle applications, such as separating workstations in a library or office, creating a barrier between seats in a waiting room, or separating desks in a learning center.

The screen assembly 12 moves from a stored position (FIG. 1A), through an anchor position (FIG. 1B), to a deployed position (FIG. 1C), where it creates a privacy barrier between adjacent vehicle seats 18. The stored position is distant from the deployed position. Thus, the screen assembly 12 is stored such that it is out of the way of passengers when it is not in use. Storing the screen assembly 12 near the rear end 16 of the vehicle 10 rather than in a passenger area 20 creates additional space in the passenger area 20 and increases comfort, convenience, and passenger cabin aesthetics. Specifically, the extra space may provide head space for a tall passenger or storage space for the passenger's belongings.

The screen assembly 12 includes three arms: a cover arm 24, a spool arm 26, and an anchor arm 28. Each of the cover arm 24, the spool arm 26, and the anchor arm 28 is independently pivotable about a pivot axis 30 (shown in FIG. 4). In the stored position, the screen assembly 12 is flush with or disposed below the parcel shelf 14. More specifically, an outer surface 32 of the cover arm 24 is flush with or recessed relative to a top surface 34 of the parcel shelf 14. The spool arm 26 and the anchor arm 28 are disposed below the cover arm 24. Thus, the spool arm 26 and the anchor arm 28 may not be visible when the screen assembly 12 is in the stored position.

The screen assembly 12 further includes a flexible screen 36 attached to a spool 38. The spool 38 is disposed on the spool arm 26 and rotatably connected to the spool arm 26. In the stored position, the screen 36 is wound around the spool 38. As the screen assembly 12 moves from the stored position to the anchor position, the cover arm 24, the spool arm 26, and the anchor arm 28 each pivot about the pivot axis 30. The screen 36 remains wound around the spool 38 in the anchor position.

As the screen assembly 12 moves from the anchor position to the deployed position, the cover arm 24 pivots about the pivot axis 30 away from the anchor arm 28. The spool arm 26 remains equidistant between the cover arm 24 and the anchor arm 28 as the screen assembly 12 moves from the anchor position to the deployed position. The screen 36 deploys in an arc shape as the cover arm 24 pivots away from the anchor arm 28. The screen 36 extends between the cover arm 24 and the anchor arm 28 to provide a visual barrier between the seats 18.

Figure 2:
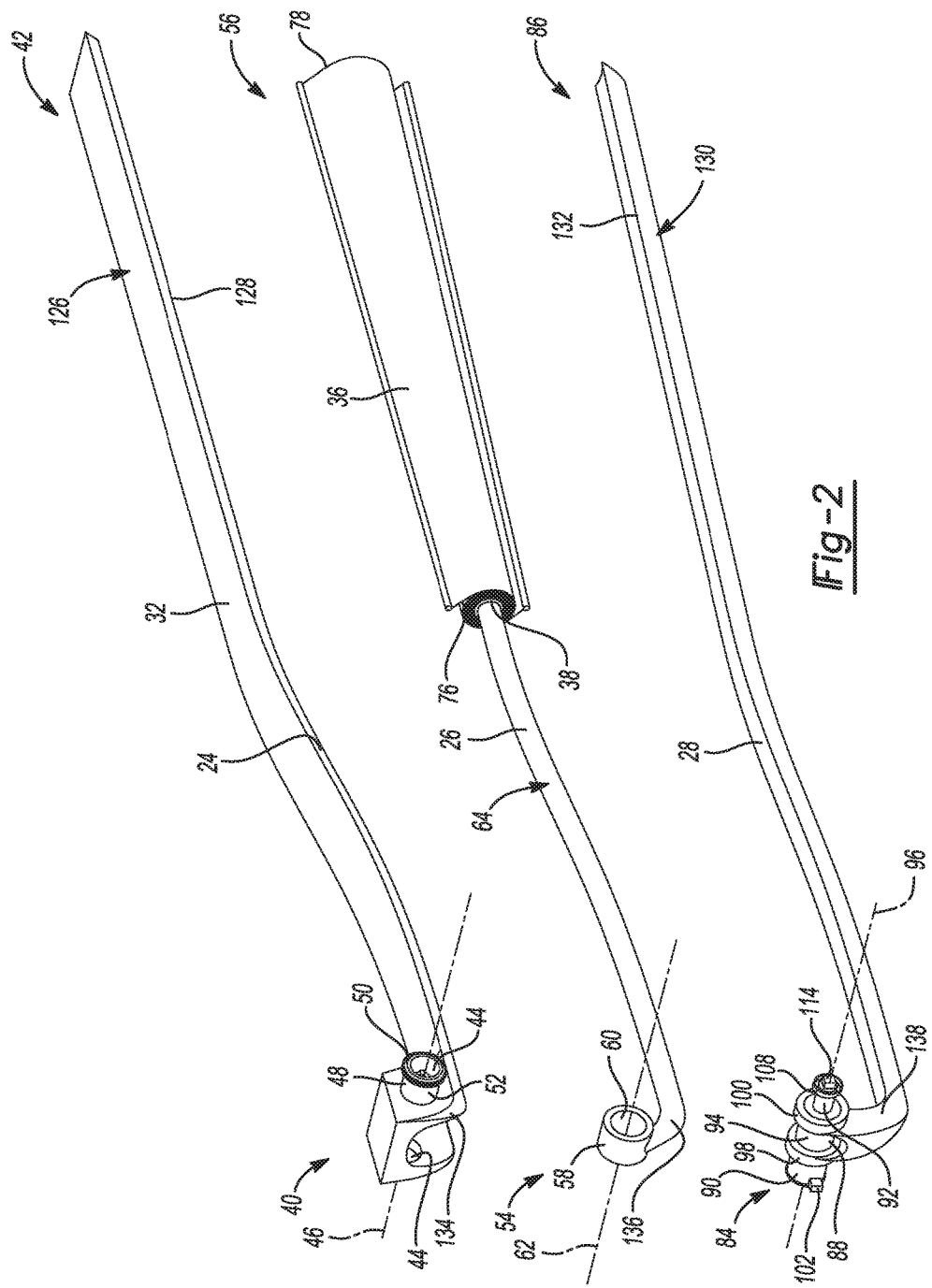
FIG. 2 is an exploded perspective view of the screen assembly of FIG. 1A illustrating a cover arm, a spool arm, and an anchor arm of the screen assembly.

With reference to FIG. 2, the cover arm 24 includes a fixed end 40 and a free end 42. The fixed end 40 defines a cylindrical aperture 44 having a central cover arm axis 46. The fixed end 40 includes a hollow cylindrical protrusion 48 that partially defines the cylindrical aperture 44. The cylindrical protrusion 48 is axially aligned with the cover arm axis 46. More specifically, the central longitudinal axis of the cylindrical protrusion 48 is collinear with the cover arm axis 46. A toothed gear 50 is concentrically disposed around an outer surface 52 of the cylindrical protrusion 48.

The spool arm 26 includes a fixed end 54 and a free end 56. The fixed end 54 includes a cylindrical sleeve 58 having an aperture 60 and a central spool arm axis 62. As best shown in FIG. 3, the spool arm 26 includes a proximal portion 64 adjacent to the fixed end 54 and a distal portion 66 adjacent to the free end 56. The proximal portion 64 has a uniform first diameter 68. The distal portion 66 has a conical frustum shape with a second diameter 70 at a first end of the distal portion 66 adjacent to the proximal portion 64 and a third diameter 72 at a second end of the distal portion 66 opposite of the first end of the distal portion 66. The third diameter 72 is greater than the second diameter 70. The second diameter 70 may be equal to the first diameter 68.

Returning to FIG. 2, the spool 38 is disposed on the distal portion 66 of the spool arm 26 and is rotatably attached to the distal portion 66. The spool 38 is sized and shaped to complement an outer surface 74 of the distal portion 66 of the spool arm (shown in FIG. 3). Thus, the spool 38 also has a conical frustum shape. A spool spring (not shown) is disposed between the spool arm 26 and the spool 38. The spool spring, which may be a torsion spring, includes a first end connected to the spool arm 26 and a second end connected to the spool 38 such that the spool spring applies a biasing force to maintain the screen 36 wound around the spool 38.

Figure 9:
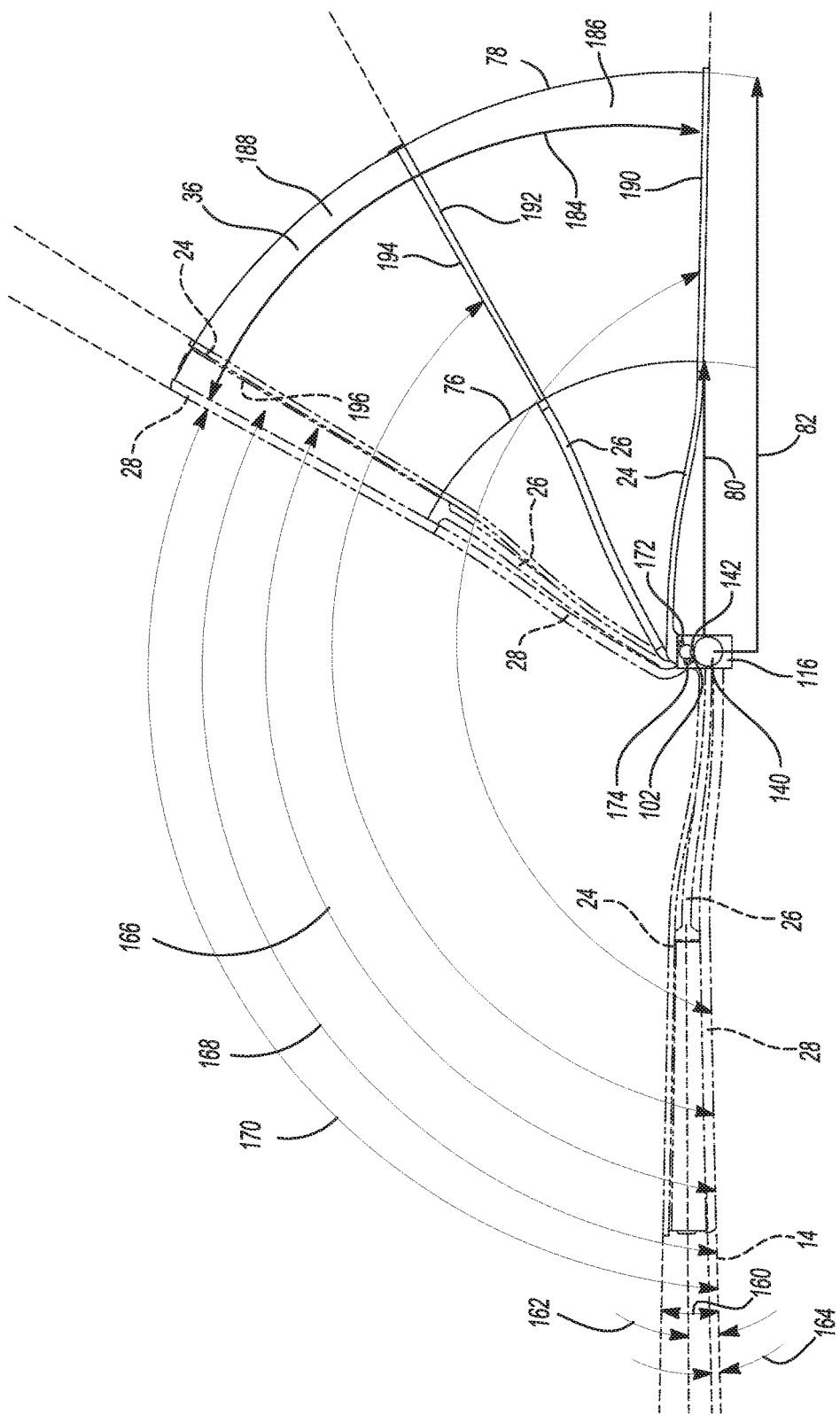
FIG. 9 is a side view of the screen assembly of FIG. 1A in the deployed position.

As discussed above, the screen 36 is wound around the spool 38 for storage. As best shown in FIG. 9, the screen 36 includes an inner edge 76 and an outer edge 78. The inner edge 76 is disposed at a first radius 80 with respect to the pivot axis 30 and the outer edge 78 is disposed at a second radius 82 greater than the first radius 80 with respect to the pivot axis 30. A first ratio of the second diameter 70 of the spool 38 to the third diameter 72 of the spool 38 is equal to a second ratio of the first radius 80 of the screen 36 to the second radius 82 of the screen 36. The proportional dimensions enable the screen 36 to wind around the spool 38 without slack.

Returning to FIG. 2, the anchor arm 28 includes a fixed end 84 and a free end 86. The fixed end 84 includes a shaft 88 having a first end portion 90, a second end portion 92, and a central portion 94 disposed between the first end portion 90 and the second end portion 92. The first end portion 90, the second end portion 92, and the central portion 94 may be cylindrical. The shaft 88 has a central anchor arm axis 96. The fixed end 84 of the anchor arm 28 further includes first and second radially-extending rings 98, 100 disposed about the shaft 88. The first radially-extending ring 98 is disposed about the shaft 88 between the first end portion 90 and the central portion 94. The second radially-extending ring 100 is disposed about the shaft 88 between the central portion 94 and the second end portion 92.

The fixed end 84 of the anchor arm 28 further includes a first stop 102 projecting radially from the first end portion 90. The first stop 102 has a rectangular cuboid shape. In various implementations, the first stop 102 may have alternative geometries, such as a wedge, a notch, or a dimple.

A drive transfer spring 108 is attached to the second end portion 92 of the shaft 88. The drive transfer spring 108 may be a constant force spring or a torsion spring. The drive transfer spring 108 is concentrically disposed around the second end portion 92 of the shaft 88. A first end (not shown) of the drive transfer spring 108 is fixed to the second end portion 92 of the shaft 88 of the anchor arm 28. A second end (not shown) of the drive transfer spring 108 is fixed to the cylindrical protrusion 48 of the cover arm 24. Thus, the drive transfer spring 108 biases the cover arm 24 and the anchor arm 28 toward one another, and therefore resists rotation of the cover arm 24 the pivot axis 130 relative to the anchor arm 28 and vice versa.

The fixed end 84 of the anchor arm 28 further includes an attachment projection 114 for securing the first end of the drive transfer spring 108 to the anchor arm 28. The attachment projection 114 extends axially from the second end portion 92 and has a central longitudinal axis that is collinear with the anchor arm axis 96. The attachment projection 114 may have a non-circular cross section, such as a square cross section, to prevent rotation of the drive transfer spring 108. That is, the first end of the drive transfer spring 108 may be wrapped around and therefore secured to the attachment projection 114. In various aspects, the attachment projection 114 may have different geometries, such as a protrusion having a triangular cross section or a hole for receiving and securing the first end of the drive transfer spring 108.

Figure 5:
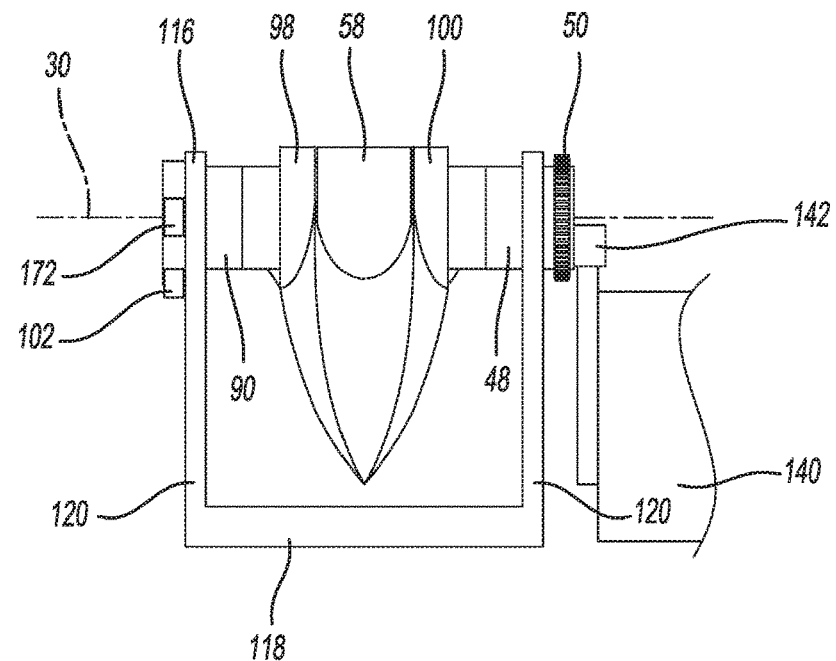
FIG. 5 is a rear view of a portion of the screen assembly of FIG. 1A including a bracket and a motor.

Referring to FIGS. 4 and 5, the screen assembly 12 further includes a bracket 116 for securing the screen assembly 12 to the vehicle 10. The bracket 116 includes a base 118 and opposing side walls 120 extending from the base 118. The bracket 116 defines a pair of opposing holes 122 aligned with the pivot axis 130. With reference to FIGS. 1A-1C, the bracket 116 is fixed to the parcel shelf 14 of the vehicle 10 and may be disposed under the parcel shelf 14 so that it is hidden from view. In various implementations, the bracket 16 may be fixed to a component of the vehicle 10 other than the parcel shelf 14, such as a portion of the interior ceiling (not shown) of the vehicle 10 disposed rearward of the seats 18.

Returning to FIGS. 2, 4, and 5, the cover arm 24, the spool arm 26, and the anchor arm 28 are rotatably connected and co-axially mounted to the bracket 116 such that the cover arm axis 46, the spool arm axis 62, and the anchor arm axis 96 are rotatable about the pivot axis 30. More specifically, the shaft 88 of the anchor arm 28 extends through the aperture 60 of the cylindrical sleeve 58 of the spool arm 26 and through the aperture 44 in the cover arm 24. The cylindrical sleeve 58 of the spool arm 26 is disposed between the first and second radially-extending rings 98, 100 on the anchor arm 24. The first end portion 90 of the shaft 88 of the anchor arm 28 and the cylindrical protrusion 48 of the cover arm 24 extend through respective opposing holes 122 of the bracket 116 and are supported by the bracket 116.

The cover arm 24 includes a distal portion 126 having an inside surface 128 that is sized and shaped to complement the screen 36 when the screen 36 is wound around the spool 38. Similarly, the anchor arm 28 includes a distal portion 130 having an inside surface 132 that is sized and shaped to complement the screen 36 when the screen is wound around the spool 38. Thus, the inside surfaces 128, 132 are concave or arc-shaped.

As shown in FIG. 2, the cover arm 24 includes a first alignment segment 134, the spool arm 26 includes a second alignment segment 136, and the anchor arm 28 includes a third alignment segment 138. The second alignment segment 136 is longer than the first alignment segment 134 and the third alignment segment 138 is longer than the second alignment segment 136. The geometry of the alignment segments 134, 136, 138 enable the distal portion 126 of the cover arm 24, the distal portion 66 of the spool arm 26, and the distal portion 130 of the anchor arm 28 to be disposed within 5 degrees of one another when the cover arm 24 and the anchor arm 28 are closed around the spool 38 as shown in FIG. 4. The cover arm 24 and the anchor arm 28 are closed around the spool 38 when the screen assembly 12 is in the stored position or the anchor position. In various aspects, the distal portion 126 of the cover arm 24, the distal portion 66 of the spool arm 26, and the distal portion 130 of the anchor arm 28 may be parallel to one another when the cover arm 24 and the anchor arm 28 are closed around the spool 38.

Figure 6:
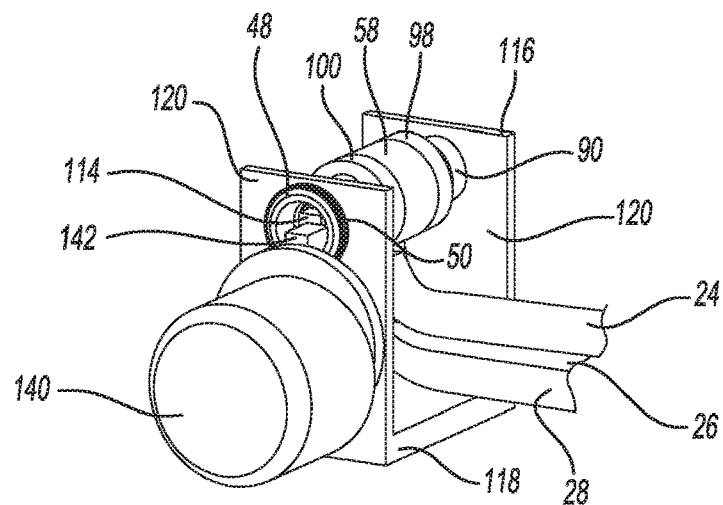
FIGS. 6-8 are perspective views of a portion of the screen assembly of FIG. 1A including the bracket and the motor shown in FIG. 5.
Figure 7:
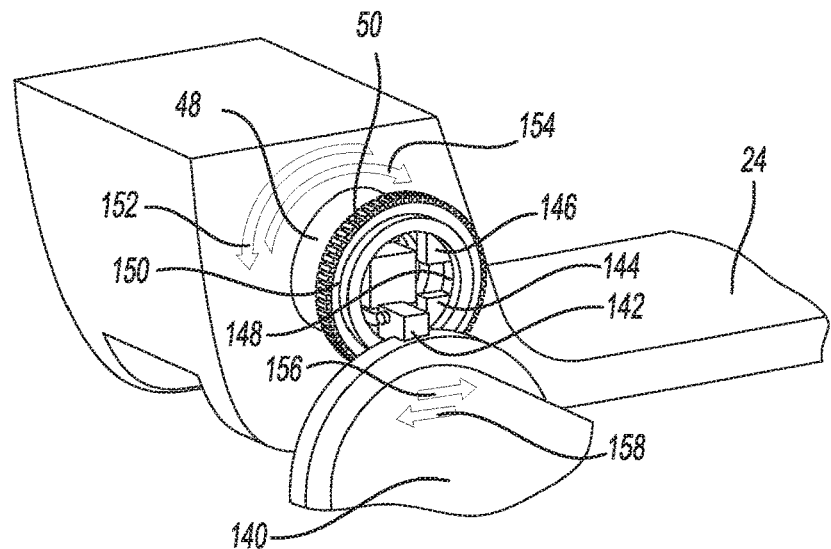

Referring to FIGS. 6 and 7, the screen assembly 12 further includes a drive motor 140. The drive motor 140 is coupled to the cover arm 24 and operable to engage the toothed gear 50 to pivot the cover arm 24 about the pivot axis 30. The drive motor 140 includes a finger 142 that is at least partially disposed within the cylindrical protrusion 48 of the cover arm 24 and adjacent to the toothed gear 50. The cover arm 24 includes first and second wedges 144, 146 that project radially inward from an inner surface 148 of the cylindrical protrusion 48.

The finger 142 of the drive motor 140 includes a toggle switch 150. The toggle switch 150 is used to stop the drive motor 140 and to change rotational direction of the drive motor 140. The toggle switch 150 moves between a first position and a second position. The first position corresponds to a first rotational direction 152 of the drive motor 140 (i.e., opening the screen assembly 12). The second position corresponds to a second rotational direction 154 of the drive motor 140 opposite the first rotational direction 152 (i.e., closing the screen assembly 12).

The toggle switch 150 is shown in the first position in FIG. 7. When the toggle switch 150 is in the first position, the drive motor 140 is capable of rotating in the first rotational direction 152 to open the screen assembly 12. As the drive motor 140 pivots the cover arm 24 in the first rotational direction 152 to open the screen assembly 12, the first and second wedges 144, 146 rotate along with the toothed gear 50. When the cover arm 24 is disposed in the deployed position, the second wedge 146 engages the toggle switch 150. Engagement of the second wedge 146 stops the drive motor 140 and slides the toggle switch 150 in a first linear direction 156 from the first position to the second position.

When the toggle switch 150 is in the second position, the drive motor 140 is capable of rotating in the second rotational direction 154 to close the screen assembly 12. When the cover arm 24 is in the stored position, the first wedge 144 engages the toggle switch 150. Engagement of the first wedge 144 stops the drive motor 140 and slides the toggle switch 150 in a second linear direction 158 from the second position to the first position. Thus, the first and second wedges 144, 146 enable the drive motor 140 to switch between first and second rotational directions 152, 154 to open and close the screen assembly 12, respectively.

Figure 8:
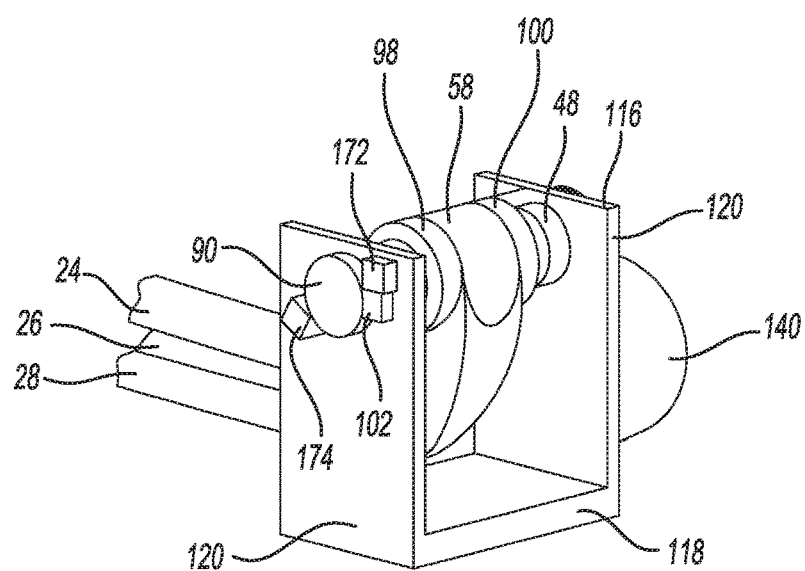
Figure 10:
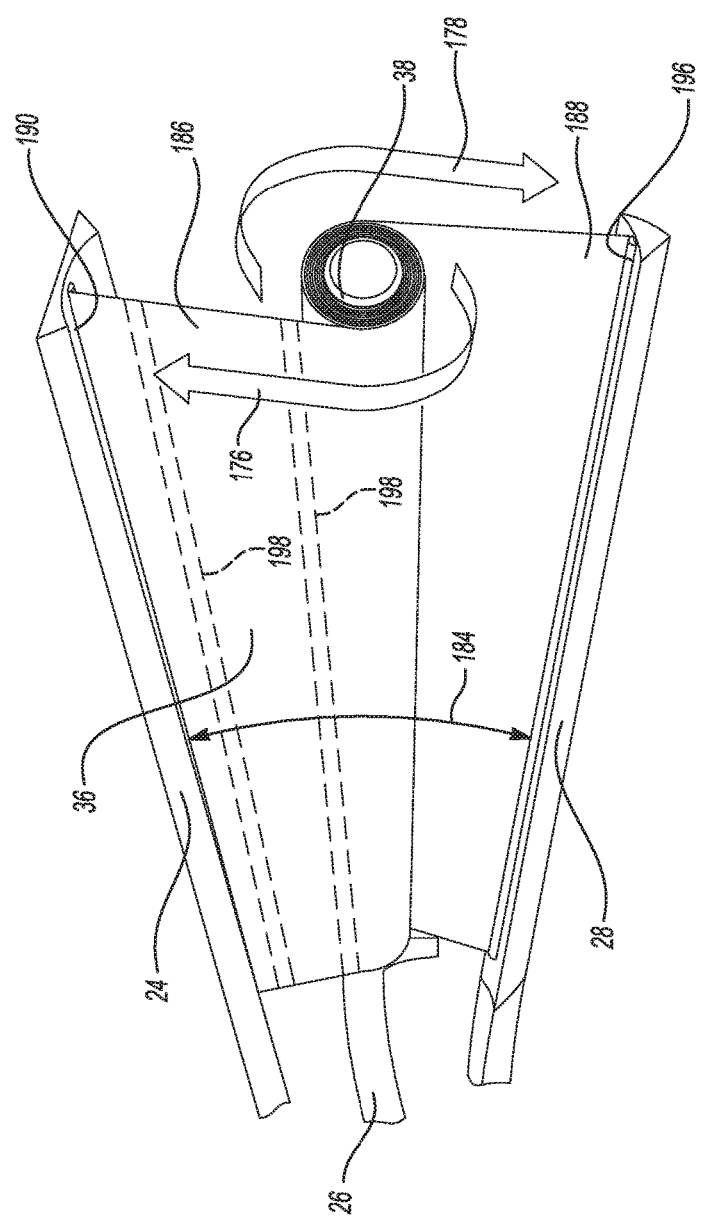
FIG. 10 is a perspective view of a portion of the screen assembly of FIG. 1A moving between the anchor position and the deployed position.

With reference to FIGS. 8-10, operation of the screen assembly 12 will now be described. The screen assembly 12 is in the stored position when it is not in use. In the stored position, the distal portion 126 of the cover arm 24 is disposed at a first angle 160 with respect to the component or parcel shelf 14. The distal portion 66 of the spool arm 26 is disposed at a second angle 162 with respect to the parcel shelf 14. The second angle 162 is within 5 degrees of the first angle 160. The distal portion 130 of the anchor arm 28 is disposed at a third angle 164 with respect to the parcel shelf 14. The third angle 164 is within 5 degrees of the second angle 162. In various implementations, each of the first, second, and third angles 160, 162, 164 may be greater than or equal to −10 degrees and less than or equal to 10 degrees.

The screen assembly 12 remains in the stored position until the drive motor 140 is activated. The drive motor 140 may be activated by a user, for example, by using a button, a touchscreen, a voice command, or a mobile phone application. When the drive motor 140 is activated, it engages the toothed gear 50 of the cover arm 24 to initiate rotation of the screen assembly 12 from the stored position to the anchor position.

The biasing force applied by the drive transfer spring 108 pivots the anchor arm 28 with the cover arm 24 as the drive motor 140 pivots the cover arm 24 from the stored position to the anchor position. The spool arm 26 remains disposed between the cover arm 24 and the anchor arm 28 and pivots with the cover arm 24 and the anchor arm 28. The spool spring applies a rotational bias force to maintain the screen 36 wound around the spool 38. Thus, the spool spring enables the spool 38 and the flexible screen 36 to apply a tension force on the spool arm 26 to maintain the spool arm 26 at a location that is equidistant between the cover arm 24 and the anchor arm 28.

In the anchor position, the cover arm 24 is disposed at a fourth angle 166 greater than the first angle 160 with respect to the parcel shelf 14. The spool arm 26 is disposed at a fifth angle 168 greater than the second angle 162 with respect to the parcel shelf 14. The fifth angle 168 is within 5 degrees of the fourth angle 166. The anchor arm 28 is disposed at a sixth angle 170 greater than the third angle 164 with respect to the parcel shelf 14. The sixth angle 170 is within 5 degrees of the fifth angle 168. In various implementations, each of the fourth, fifth, and sixth angles 166, 168, 170 may be greater than or equal to about 110 degrees and less than or equal to about 130 degrees, optionally about 120 degrees.

The anchor arm 28 is mechanically prevented from pivoting past the sixth angle 170 by engagement of the first stop 102 with the bracket 116. More specifically, the bracket 116 includes a second stop 172 and a third stop 174. In the stored position (best shown in FIG. 8), the first stop 102 of the anchor arm 28 engages the second stop 172 of the bracket 116 to prevent rotation of the anchor arm 28 in the second rotational direction 154. In the anchor position (best shown in FIG. 10), the first stop 102 of the anchor arm 28 engages the third stop 174 of the bracket 116 to prevent rotation of the anchor arm 28 in the first rotational direction 152. Thus, the anchor arm 28 can only be disposed at angles greater than or equal to the third angle 164 and less than or equal to the sixth angle 170.

As the drive motor 140 pivots the cover arm 24 from the anchor position to the deployed position, the third stop 174 prevents further rotation of the anchor arm 28. Thus, rotation of the cover arm 24 from the anchor position to the deployed position stretches and strains the drive transfer spring 108. As the cover arm 24 pivots from the anchor position to the deployed position, the spool arm 26 remains disposed equidistant between the cover arm 24 and the anchor arm 28 due to the tension of the screen 36 as it unwinds from the spool 38.

Referring to FIG. 10, as the cover arm 24 pivots from the anchor position to the deployed position, the cover arm 24 moves relative to the anchor arm 28 and the spool arm 26. When this occurs, the screen 36 is dispensed in opposing first and second circumferential directions 176, 178. In various implementations, the anchor arm 28 moves relative to the cover arm 24 and the spool arm 26 to dispense the screen 36. In various other implementations, the cover arm 24 and the anchor arm 28 move relative to one another and to the spool arm 26 to dispense the screen 36. The spool 38 rotates with respect to the spool arm 26 as the screen 36 is dispensed.

In the deployed position, the cover arm is disposed at a seventh angle 180 with respect to the parcel shelf 14, and the spool arm 26 is disposed at an eighth angle 182 with respect to the parcel shelf 14. The seventh angle 180 is greater than the fourth angle 166, and the eighth angle 182 is greater than the fifth angle 168. The eighth angle 182 is within 5 degrees of the seventh angle 180. In various implementations, the seventh and eighth angles 180, 182 may be greater than or equal to 170 degrees and less than or equal to 190 degrees, optionally 180 degrees. The anchor arm 28 is disposed at the sixth angle 170 with respect to the parcel shelf 14. Thus, in the deployed position, the cover arm 24 is spaced apart from the anchor arm 28 to define a gap 184.

The screen 36 extends through an arc-shaped path across the gap 184. The screen 36 includes a first screen portion 186 and a second screen portion 188. The first screen portion 186 includes a first edge 190 attached to the cover arm 24 and a second edge 192 attached to the spool arm 26. The second screen portion 188 includes a third edge 194 attached to the spool arm 26 and a fourth edge 196 attached to the anchor arm 28. Therefore, when the screen 36 is wound around the spool 38 (i.e., in the anchor position and the stored position), the first screen portion 186 and the second screen portion 188 are both wound around the spool 38.

The drive motor 140 closes the screen assembly 12 in response to an occupant command, such as a voice command or a command generated when the occupant presses a button. To close the screen assembly 12, the drive motor 140 pivots the cover arm 24 toward the anchor arm 28. As the cover arm 24 moves toward the anchor arm 28, the spool spring co-winds the first and second screen portions 188, 190 around the spool 188. Tension of the screen 36 due to the spool spring causes the spool arm 26 to pivot toward the anchor position. The screen assembly 12 moves through the anchor position and continues toward the stored position. After the screen assembly passes through the anchor position, the first stop 102 of the anchor arm disengages the third stop 174 of the bracket 116 and the drive spring 108 causes the anchor arm 28 to move with the cover arm 24 to the stored position.

In various implementations, the screen 36 may include a plurality of radially-extending supports 198. The radially-extending supports 198 may extend from the inner edge 76 of the screen 36 to the outer edge 78 of the screen 36. The radially-extending supports 198 may alternatively extend partially between the inner edge 76 and the outer edge 78.

In various implementations, the screen assembly 12 may be provided without a distinct spool arm. That is, the spool 38 and screen 36 may be integrated with the cover arm 24 or the anchor arm 28. The screen 36 may be a single piece extending between the cover arm 24 and the anchor arm 28 (not shown).

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A screen assembly for providing a visual barrier between adjacent seats in a passenger cabin of a vehicle, the screen assembly comprising:
   an anchor arm connected to a component of the vehicle within the passenger cabin;
   a cover arm;
   a spool arm disposed between the anchor arm and the cover arm;
   a spool inserted onto the spool arm and rotatable relative to the spool arm; and
   a flexible screen attached to the spool and including a first portion and a second portion, the first portion of the flexible screen having a first edge attached to the spool arm and a second edge attached to the anchor arm, the second portion of the flexible screen having a first edge attached to the spool arm and a second edge attached to the cover arm, wherein the first and second portions of the flexible screen are dispensed in opposite directions when at least one of the cover arm and the anchor arm moves relative to the spool arm.

2. The screen assembly of claim 1 wherein the cover arm is pivotally connected to the component and is rotatable relative to the component about a pivot axis.

3. The screen assembly of claim 2 wherein each of the anchor arm, the cover arm, and the spool arm is pivotally connected to the component and is rotatable relative to the component about the pivot axis.

4. The screen assembly of claim 3 further comprising a bracket fixed to the component and pivotally connecting each of the anchor arm, the cover arm, and the spool arm to the component, wherein the anchor arm, the cover arm, and the spool arm are co-axially mounted to the bracket.

5. The screen assembly of claim 4 wherein the bracket includes a stop configured to engage the anchor arm to prevent rotation of the anchor arm in a first direction beyond a first position.

6. The screen assembly of claim 4 wherein:
   the screen assembly is adjustable between a stored position and a deployed position;
   when the screen assembly is in the stored position, the cover arm is disposed at a first angle with respect to the component; and
   when the screen assembly is in the deployed position, the cover arm is disposed at a second angle with respect to the component, the anchor arm is disposed at a third angle with respect to the component, and the spool arm is disposed at a fourth angle with respect to the component, the second angle being greater than the first angle, the third angle being greater than the first angle and less than the second angle, and the fourth angle being greater than the third angle and less than the second angle.

7. The screen assembly of claim 6 further comprising a drive motor that is coupled to the cover arm and operable to pivot the cover arm between the first angle and the second angle.

8. The screen assembly of claim 6 further comprising a drive transfer spring coupling the anchor arm to the cover arm and configured to apply a biasing force to the anchor arm to pivot the anchor arm to the third angle when the cover arm pivots from the first angle to the second angle.

9. The screen assembly of claim 1 wherein the spool and the flexible screen apply a tension force on the spool arm to maintain the spool arm at a location that is equidistant between the anchor arm and the cover arm.

10. A screen assembly for providing a visual barrier between adjacent seats in a passenger cabin of a vehicle, the screen assembly comprising:
an anchor arm connected to a component of the vehicle within the passenger cabin;
a cover arm pivotally connected to the component and rotatable relative to the component between a first position and a second position, the cover arm being disposed at a first angle relative to the component when the cover arm is in the first position, the cover arm being disposed at a second angle relative to the component when the cover arm is in the second position, the second angle being greater than the first angle, the cover arm being spaced apart from the anchor arm to define a gap when the cover arm is disposed at the second angle relative to the component; and
a flexible screen having a first side fixed to the anchor arm and a second side fixed to the cover arm, the flexible screen extending through an arc-shaped path across the gap when the cover arm is disposed at the second angle relative to the component.

11. The screen assembly of claim 10 further comprising a drive motor coupled to the cover arm and configured to pivot the cover arm between the first angle and the second angle.

12. The screen assembly of claim 10 wherein each of the cover arm and the anchor arm is pivotally connected to the component and rotatable about a pivot axis.

13. The screen assembly of claim 12 further comprising:
a spool arm disposed between the anchor arm and the cover arm, pivotally connected to the component, and rotatable about the pivot axis; and
a spool inserted onto the spool arm and rotatable relative to the spool arm, wherein the flexible screen includes a first portion and a second portion, the first portion of the flexible screen having a first edge attached to the spool and a second edge attached to the anchor arm, the second portion of the flexible screen having a first edge attached to the spool and a second edge attached to the cover arm, the first and second portions of the flexible screen being dispensed in opposite directions as at least one of the cover arm and the anchor arm pivots relative to the spool arm.

14. The screen assembly of claim 13 wherein the spool has a conical frustum shape.

15. The screen assembly of claim 14 wherein:
the flexible screen has an inner edge disposed at a first radius relative to the pivot axis and an outer edge disposed at a second radius relative to the pivot axis;
the spool has a first diameter at a first end of the spool disposed adjacent the pivot axis and a second diameter at a second end of the spool disposed opposite of the first end; and
a first ratio of the first diameter to the second diameter is proportional to a second ratio of the first radius to the second radius.

16. The screen assembly of claim 12 wherein:
the screen assembly is adjustable between a stored position and a deployed position;
when the screen assembly is in the stored position, the cover arm is disposed at the first angle relative to the component; and
when the screen assembly is in the deployed position, the cover arm is disposed at the second angle with respect to the component and the anchor arm is disposed at a third angle with respect to the component, the third angle being greater than the first angle and less than the second angle.

17. The screen assembly of claim 16 further comprising a drive transfer spring coupling the anchor arm to the cover arm and configured to apply a biasing force to the anchor arm to pivot the anchor arm between the first angle and the third angle when the cover arm pivots between the first angle and the third angle.

18. The screen assembly of claim 16 further comprising a bracket pivotally connecting each of the anchor arm and the cover arm to the component, wherein the bracket includes a stop configured to engage the anchor arm to prevent rotation of the anchor arm to a fourth angle that is greater than the third angle.

19. The screen assembly of claim 16 wherein:
the component is a shelf disposed rearward of the seats; and
the screen assembly is disposed below a top surface of the shelf when the screen assembly is in the stored position.

20. The screen assembly of claim 16 wherein:
the screen assembly is adjustable to an anchor position disposed between the stored position and the deployed position; and
when the screen assembly is in the anchor position, the anchor arm is disposed at the third angle relative to the component and the cover arm is disposed at a fifth angle relative to the component, wherein the fifth angle is within 5 degrees of the third angle.

* * * * *